Figure 1:
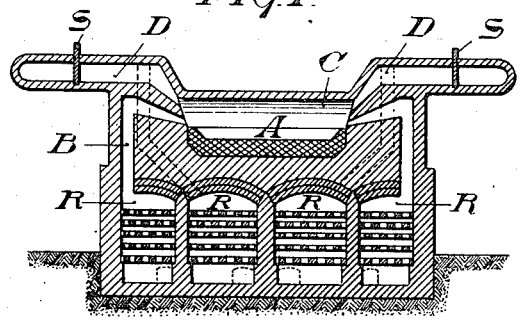

O. SCHLEIMER.
PROCESS OF MANUFACTURING IRON FROM THE SCRAP OF ZINCED SHEET IRON.
APPLICATION FILED NOV. 13, 1914.

1,209,628.

Patented Dec. 19, 1916.
2 SHEETS—SHEET 1.

Witnesses:

Inventor:
Otto Schleimer

UNITED STATES PATENT OFFICE.

OTTO SCHLEIMER, OF NEUSS, GERMANY, ASSIGNOR TO THE FIRM OF DR. KURT ALBERT CHEMISCHE FABRIK, OF NEUSS, GERMANY.

PROCESS OF MANUFACTURING IRON FROM THE SCRAP OF ZINCED SHEET-IRON.

1,209,628.

Specification of Letters Patent.

Patented Dec. 19, 1916.

Application filed November 13, 1914. Serial No. 872,033.

*To all whom it may concern:*

Be it known that I, OTTO SCHLEIMER, engineer, citizen of Germany, subject of the King of Prussia and Emperor of Germany, residing at Neuss-on-the-Rhine, in the Kingdom of Prussia and Empire of Germany, have invented new and useful Improvements in Processes of Manufacturing Iron from the Scrap of Zinced Sheet-Iron, of which the following is a specification.

My invention relates to improvements in processes of manufacturing ingot iron or steel from the scrap of zinced sheet iron.

Till now scrap galvanized or zinced sheet iron is worked up either on the wet method by treating it with acid or on the dry method by breaming it in a furnace. Neither of these methods, however, is adapted to recover the iron completely and rationally, and in both of them the zinc is removed only imperfectly; for, in the one method, the iron is violently attacked by the acid and, in the other, it is covered with thick scale of oxid of zinc owing to oxidation of the zinc by the flames. In addition, in the dry method the heat of the flames employed is completely lost. The scrap iron material recovered by these methods has only little value and is not willingly employed by steel works for being melted down, because it causes irregularity in working, owing to stoppage of the regenerative chambers with zinc oxid, and destruction of the hearth and the like.

A primary object of my invention is to provide an improved process of preparing galvanized scrap iron for manufacture into ingot iron or steel to which these defects are not attached. To this end I employ high temperatures by using a previously smelted, highly heated iron bath containing carbon into which the galvanized iron is charged. Most of the zinc burns off at once with a highly luminous flame and is volatilized. Some of the zinc oxid produced remains on the iron, covering it with a white layer, but this portion is completely volatilized when heated further. Namely, at the smelting heat iron has the property of reducing zinc oxid according to the formula:

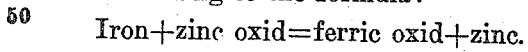

Iron+zinc oxid=ferric oxid+zinc.

The zinc oxid adhering to the iron is therefore reduced by the latter to metal before or when the iron melts. The metallic zinc which is thus produced and volatilized in consequence of the high temperature is oxidized to zinc oxid, as well as the zinc oxid which is at once produced by combustion and volatilization when the galvanized iron is charged, is drawn away with the waste gases from the furnace and recovered by filtration in a well known manner.

For obtaining the requisite high temperature for removing the zinc the open hearth furnace and the electric furnace are most suitable, the former owing to its heat storage in the regenerators, and the latter owing to its inherent high heating effect. As the regenerators, however, must be shut off from the zinc oxids which are produced, in order to prevent the regenerator chambers from becoming stopped up by zinc oxid, and therefore cannot contribute toward raising the temperature during the removal of the zinc, in order to obtain the high temperature requisite for removing the zinc in my improved process I use an iron bath which contains carbon and has been previously highly heated by means of the regenerative chambers. This bath is, so to say, the heat storage for the following removal of zinc and at the same time serves both for protecting the hearth from the destructive action of the zinc or zinc oxid and also for bringing about rapid and complete removal of the zinc in the form of zinc oxid by means of the highly heated reducing agents, iron and carbon dissolved in the iron. When the galvanized metal has been melted down to a liquid condition the zinc is by this time perfectly removed and it is possible to recover the iron completely because the remainder of the smelting process is identical with the ordinary process used in open hearth or electric furnaces in order to make iron or steel from iron scrap in continuing the melting process until the impurities are removed and adding such materials for obtaining the desired quality of iron and steel.

The product obtained by smelting the iron material prepared by my new process is a pure, soft material which can be readily cut and welded or can, of course, be transferred into high grade steel by adding suitable admixtures to the liquid iron. A specially valuable feature of the iron produced in the described manner is its freedom from sulfur and oxygen, this being due to the sulfur-removing and deoxidizing properties of zinc.

In order that the invention may be clearly understood reference will be made to the accompanying drawing, wherein:—

Figure 2:
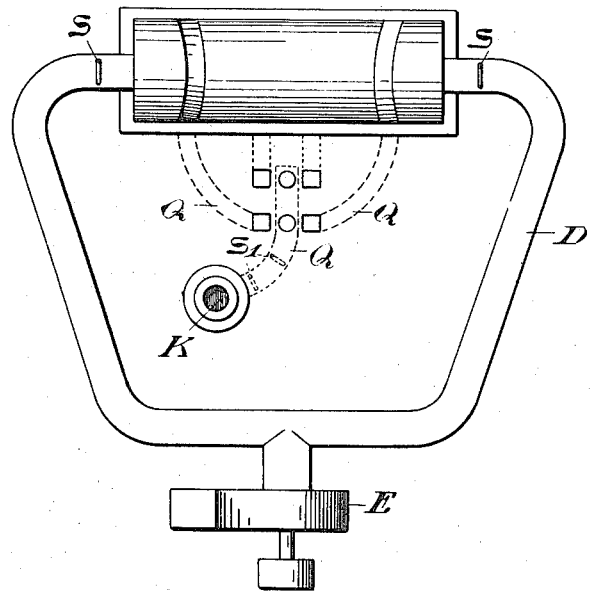
Figure 3:
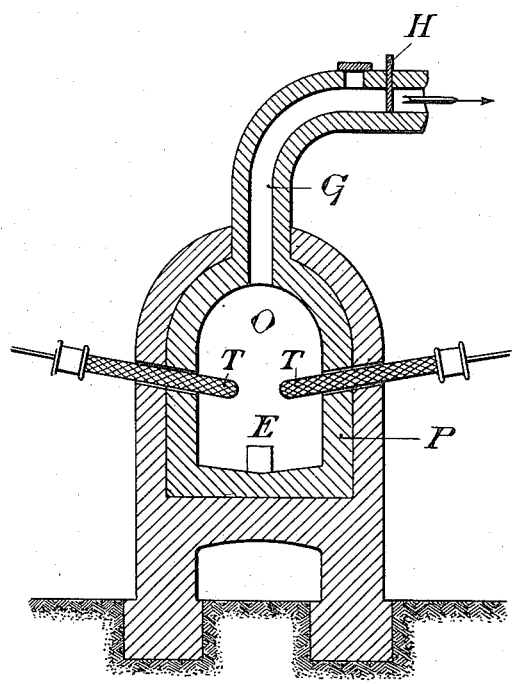

Figs. 1 and 2 are vertical section, and top plan view partly in horizontal section, respectively, diagrammatically showing an open hearth furnace, and Fig. 3 is a vertical section through an electric furnace adapted for carrying my improved process into practice.

When the open hearth furnace is used, for drawing off the waste gases containing zinc oxid the furnace must have at its ends, tapping side or roof special flues which can be connected to a fan and closed by slide valves or the like. Referring to Figs. 1 and 2, the open hearth or Siemens-Martin furnace comprises the smelting hearth A and the flues B leading to the regenerator chambers R. Connected to the roof C are flues D which can be closed by slide valves S and are connected with a fan E (Fig. 2). The regenerator chambers can be shut off from the smoke-stack K by slide valves $S^1$ or the like arranged in the channels Q coming from the regenerator chambers.

The described furnace is operated as follows:—After the hearth and fire-bridges have been repaired in known manner the hearth is covered with lime or lime-stone and immediately thereupon the quantity of pig-iron or scrap iron containing carbon, such as broken castings, grates and the like requisite for making the iron bath is charged in. By means of the regenerative chambers R this charge is then melted down and highly heated. When the sufficiently high temperature has been obtained the process of removing the zinc from galvanized iron scrap commences. For this purpose the valves S are opened, the fan E is started, the chambers R are shut off against draft in the direction to the smoke-stack K by closing the valves $S^1$, the galvanized material is charged into the bath and the waste gases containing zinc oxid are drawn away from the furnace by the fan E in order to filter off the zinc oxid in known manner. After the zinc has been completely removed the regenerator chambers are employed again by opening the valves $S^1$, the valves S are closed, the fan E is stopped, and the charge is prepared and finished as usual.

Referring now to Fig. 3, the arrangement of the electric furnace adapted for carrying my process into practice differs from that of the ordinary one only in the furnace chamber O of the furnace P over the smelting hearth F being connected by a flue G with a fan or the like, not shown. This flue G can be closed by a slide valve H. The apparatus for removing zinc, the arrangement of the discharge flue, fan filtering plant and the like, is the same as described above with reference to Figs. 1 and 2 except that in the electric furnace the regenerator chambers and their valves are absent.

The smelting process is also the same as that described above with reference to Figs. 1 and 2. In spite of the higher temperature available it is preferable first to melt down the iron bath and only then to begin with the process for removing the zinc from zinced iron scrap.

Having now described my invention what I claim and desire to secure by Letters Patent of the United States is:

1. A process of manufacturing iron or steel from galvanized iron in open-hearth or electric furnaces consisting in preparing a highly heated iron bath rich in carbon, charging and melting down galvanized iron in said bath, and continuing the process in the known manner.

2. A process of manufacturing iron or steel from galvanized iron in open-hearth or electric furnaces consisting in preparing a highly heated iron bath rich in carbon, charging and melting down galvanized iron in said bath, removing and recovering the zinc, and continuing the process in the known manner.

In testimony whereof I have hereunto set my hand in presence of two subscribing witnesses.

OTTO SCHLEIMER. [L. S.]

Witnesses:
 ALBERT NUFER,
 GEORGE G. L. WARD.